Dec. 4, 1962     R. S. LONG ET AL     3,067,010
PROCESS FOR PREPARATION OF TITANIUM DIOXIDE
Filed Oct. 19, 1960
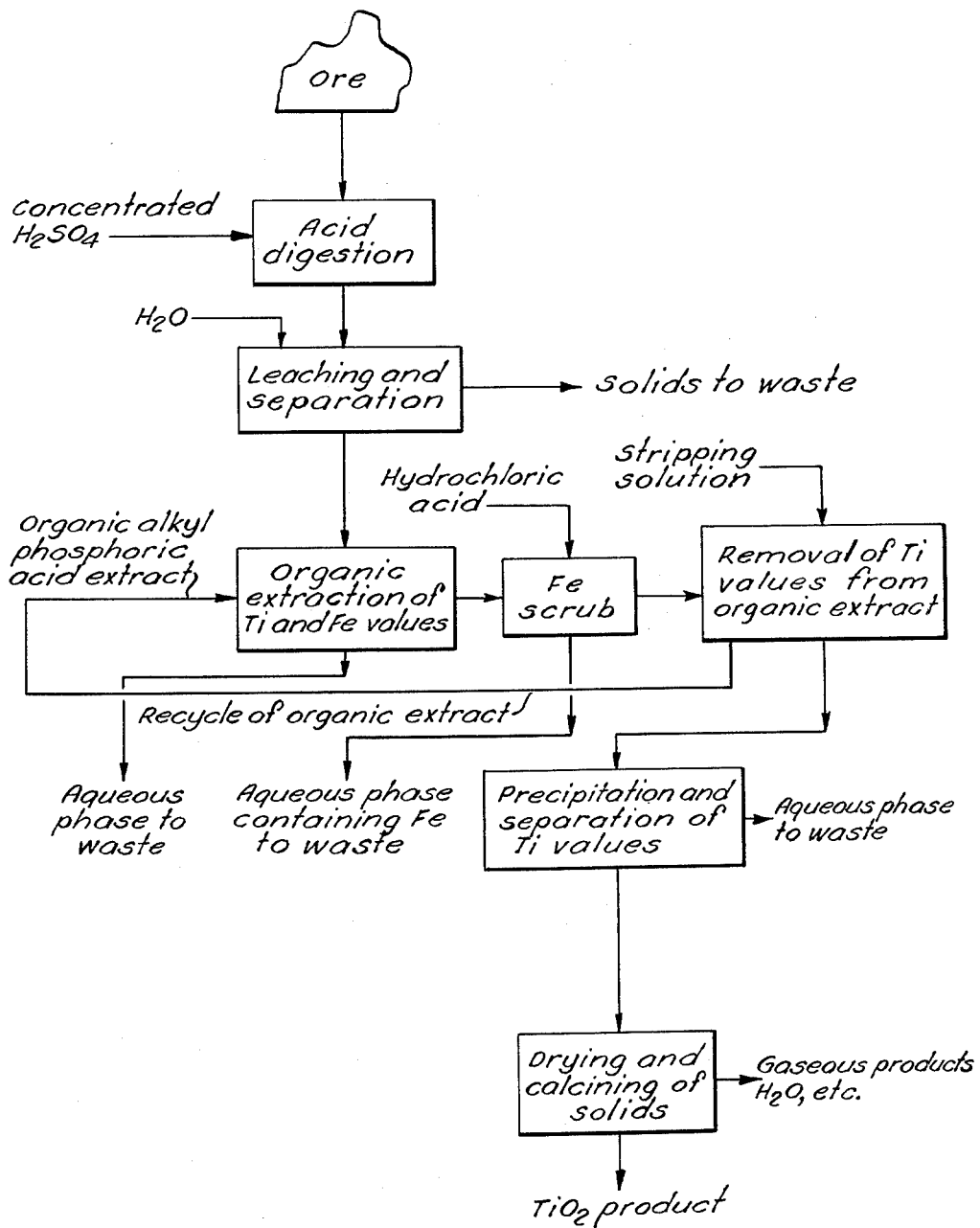
INVENTORS.
Ray S. Long
Robert S. Olson
Joseph P. Surls, Jr.
BY C. Kenneth Bjork
AGENT 3,067,010
PROCESS FOR PREPARATION OF
TITANIUM DIOXIDE
Ray S. Long, Concord, and Robert S. Olson and Joseph P. Surls, Jr., Walnut Creek, Calif., assignors to The Dow Chemical Company, Midland, Mich., a corporation of Delaware
Filed Oct. 19, 1960, Ser. No. 63,546
6 Claims. (Cl. 23—202)

This invention relates to the preparation of titanium dioxide and more particularly is concerned with an improved process for the preparation of a high quality titanium dioxide from ilmenite type ores.

Presently, almost all of the pigment grade titanium dioxide ($TiO_2$) is prepared from ilmenite ores by a rather complex and lengthy process. In the process as presently practiced, roasted ore is digested with concentrated sulfuric acid at about 250° C. to make water soluble the titanium values contained therein. This digestion also dissolves iron values present and several subsequent treatment steps are required just to separate the titanium from the iron and the sulfate. The steps of this separation treatment include; (1) leaching the reaction mass with water, (2) filtering to separate the solution of titanium and iron values from the insoluble products, (3) reduction of ferric iron to ferrous iron by addition of metallic iron to the filtrate, (4) evaporation and cooling of the solution to precipitate most of the iron as $FeSO_4 \cdot 7H_2O$, (5) separation of the $FESO_4 \cdot 7H_2O$ from the remaining solution, (6) precipitation of titanium values as hydrated titanium dioxide and sulfate, for example, by heating the solution to the boiling point, and (7) washing, repulping and refiltering as many as four times this titanium product to eliminate residual iron and other impurities therefrom. This product is then filtered from the residual solution and calcined at about 1,000° C. to yield the desired titanium dioxide product.

It is the principal object of the present invention to provide an improved method for the preparation of titanium dioxide utilizing a sulfuric acid acidulation and a liquid-liquid extraction and purification technique.

It is a further object of the present invention to provide a method for the production of titanium dioxide which eliminates the many complex precipitation and washing purification steps as presently are followed in the conventional sulfuric acid process for the preparation of titanium dioxide from ilmenite ores.

It is an additional object of the present invention to provide a method for the production of titanium dioxide wherein the organic liquid extractant medium can be recovered and recycled for reuse in the system.

It is another object of the present invention to provide a method for the production of titanium dioxide wherein the product as prepared has a low impurity content within that range which is acceptable for pigment-grade titanium dioxide.

A further object is to provide a method for the production of titanium dioxide using lower grade ores than were formerly applicable.

Other objects and advantages will become apparent upon reading the detailed description presented hereinafter and by reference to the accompanying drawing.

The drawing presents a schematic flow diagram of the general process of the instant invention for preparing a high purity titanium dioxide.

Unexpectedly, now it has been found that a pigment-grade titanium dioxide can be prepared from ilmenite ores by the improved process of the instant invention which comprises; (1) reaction of the ore with sulfuric acid, (2) leaching the dissolved metal values, (3) liquid-liquid extraction of the resulting titanium metal value containing solution or slurry thereof with a mono- or dialkyl substituted orthophosphoric acid, (4) precipitation of the titanium values from the organic phase by addition of a base or other suitable reagent, (5) conversion of the precipitated titanium values to a hydrated oxide and (6) calcination of the hydrated titanium oxide product to obtain a pure titanium dioxide.

Dissolved ferric iron values can be reduced to the less extractable ferrous state prior to the extraction by the alkyl phosphate and/or these iron values can be scrubbed from the loaded organic extract prior to removal of the titanium values therefrom.

In carrying out the process of the present invention, a titanium-bearing ilmenite ore is subjected to the action of a concentrated sulfuric acid. The dissolution of the titanium is favored by use of sulfuric acid having more than 70 percent $H_2SO_4$ on a weight basis. Preferably sulfuric acid of about 90 weight percent or more $H_2SO_4$ will be utilized for the acidulation.

The minimum amount of acid to be used will be that wherein one stoichiometric molar equivalent of $H_2SO_4$ is present for each mole of metal value present in the ore. However, considerably increased solubilization of the titanium values is achieved if an equivalent molar excess of from about 25 to about 50 percent of the acid is utilized. Further, the acid digestion and subsequent leaching of the titanium is promoted if a small amount of antimony III oxide ($Sb_2O_3$), antimony III sulfide ($Sb_2S_3$) or mixtures of these is added to the reaction mixture.

Good results are obtained simply by adding the acid to as received ore and carrying out the reaction at ambient temperatures. However, titanium recoveries are promoted by heating the reaction mixture of the ore and acid after the initial exothermic reaction obtained upon first mixing has subsided. For example, it has been unexpectedly found that if the acidulated cake obtained using about a 50 percent equivalent molar excess of the acid is roasted at about 250° C. for a period of from about 1 to 2 hours or more prior to teaching, titanium recoveries of over 90 percent are realized.

Although the maximum time of reaction for acidulation is not critical, the minimum time of reaction of acid and ore is to be that time during which a continued heat evolution is noticed. Normally, the acid digestion will be run from about ½ to about 3 hours.

Following production of the acidulated ore cake, the titanium values are leached from this reaction cake with water using conventional leaching and separation techniques. The amount of water to be used for this leaching is not critical, but will be governed to some extent by the particular type of organic extractant selected for use in the process. (This will be discussed in detail hereinafter.) Direct water leaching of the acid-ore cake dissolves the titanium values in good yield along with the iron which is present as the chief impurity.

Preferably, this water leach will be performed at reaction temperatures of less than 80° C. and desirably at about 60° C. or less. At temperatures below the maximum shown, formation of undesirable colloidal hydrated titanium oxide is actually prevented or held to a tolerable value. Leaching at higher temperatures promotes formation of considerable amounts of the hydrated oxide colloid. The presence of this colloid promotes the frmation of troublesome hard-to-break emulsions during the subsequent alkyl phosphate extraction of titanium values from the reaction solution.

The leach liquor containing the titanium values is separated from the residual cake by filtering, centrifuging or other similar techniques. This liquor then can be treated with metallic iron, zinc, aluminum, sodium, sulfide, sodium hydrosulfide or other reductants to reduce the ferric iron to the less extractable ferrous state. The acidic aqueous phase is then brought into liquid-liquid contact with a mono- or dialkyl substituted orthophosphoric acid extractant. Substances useful for extracting titanium from the acidic aqueous phase are those mono- and dialkyl substituted orthophosphoric acids wherein the number of carbon atoms present on each alkyl group will range from about 4 to about 18 or more. Preferably the alkyl groups will each contain about 8 or more carbon atoms. Substituted acids which have been found especially effective, for example, are di(2-ethylhexyl)orthophosphoric acid (DEHPA), monododecyl orthophosphoric acid (DDPA) and monoheptadecyl orthosphosphoric acid (HDPA).

All three of these organic acid extractants under specific conditions will extract titanium about equally as well from the leach liquor and all approach saturation values corresponding roughly to about 2 moles of extractant per mole of titanium. However, it has been found that the rate of extraction of the metal values by the substituted phosphoric acid extractants is influenced both by the concentration of the sulfuric acid in the leach liquor and the type of extractant used. To illustrate, the mono- and dialkyl phosphates will extract titanium values almost equally as well and in a matter of minutes from a solution that is relatively dilute in $H_2SO_4$, i.e. containing less than about 15 percent by weight $H_2SO_4$. However, as the concentration of $H_2SO_4$ in the final leach solution is increased above 15 percent, the extraction rate for the dialkyl phosphates is markedly reduced and at an acid concentration of about 40 percent by weight $H_2SO_4$ for example, hours to days are required for substantially complete titanium extraction by the dialkyl phosphates. No observable extraction rate change occurs at this acid concentration when using the mono alkyl substituted phosphoric acids. In fact, effective extraction of titanium values from sulfuric acid solutions containing up to 75 percent or more $H_2SO_4$ by weight is achieved in a short contact time (minutes) utilizing the monalkyl phosphates.

Tendencies towards emulsion formation during the liquid-liquid extraction, in the event that objectionable amounts of colloidal hydrated titanium oxide are present in the system, substantially can be eliminated by carrying out this extraction at temperatures ranging from about 15° to about 70° C.

The organic extractant can be used directly to extract the metal values from the aqueous phase, however, advantageously this extractant can be carried in a suitable solvent or diluent. The minimum requirements for such a carrier are (1) the solvent be insoluble in the aqueous phases contacted therewith, (2) the extractant be soluble in the solvent and (3) the extractant-metal value extract be soluble in the solvent. Representative excellent diluents which can be used are kerosene, isopropyl ether, and Stoddard solvents. Other useful diluent materials are aliphatic hydrocarbons, aromatic hydrocarbons, halogenated hydrocarbons, ethers, and petroleum derived materials such as diesel oil, aromatic oils, distillates, various commercial organic solvents, gasoline and petroleum ethers.

Useful concentrations of the organic-substituted phosphoric acid extractant in the solvent can range from about 0.1 to about 3 molar and preferably is about 1 molar. For example, a solution containing about 1 molar weight DEHPA per liter in kerosene was found to be effective as an extractant for removing titanium from a dilute $H_2SO_4$ solution.

The relative amounts of the extractant solution to aqueous solution containing metal values therein to be utilized can vary from an organic/aqueous phase ratio of from about 1/0.1 to about 1/10. The actual amount of alkyl-substituted phosphoric acid extractant to be employed will be the substantially stoichiometric molar equivalent of the moles of metal values to be extracted.

In actual operation the extracting step can be carried out using conventional mixer-settlers, countercurrent extractors, and the like in single or multiple stages.

Following separation of the titanium laden organic phase from the extracted water phase any residual iron is now removed by scrubbing the loaded organic phase with aqueous hydrochloric acid. In this operation, the concentration of scrub acid to be used will range from about 3 to about 12 molar. Preferably the concentration of the acid will be from about 5 to about 12 molar and selection of a desired concentration for most effective stripping will be governed by the type of organic extractant being used. With the monoalkyl substituted orthophosphoric acids, scrubbing effectiveness increases with increase in the HCl concentration, with optimum scrubbing being obtained with the more concentrated (from about 10 to about 12 molar) hydrochloric acid solutions. with the dialkyl substituted orthophosphoric acids, however, optimum stripping of the iron values is obtained utilizing from 4 to about 6 molar hydrochloric acid.

This scrubbing can be carried out using conventional liquid-liquid scrubbing and stripping techniques. The maximum amount of stripping acid to be used is not critical, but the solution must contain at least that amount of HCl which is equivalent on a stoichiometric molar basis to the amount of dissolved iron values present in the organic extract. For most practical stripping, the phase ratio of hydrochloric acid to organic extract will range from about 1/1 to about 1/10 on a volume basis.

Stripping of the titanium from the substantially iron-free organic phase after separation of this phase from the hydrochloric acid strip solution is accomplished by adding to this titanium loaded extract an aqueous solution the solute of which is a member selected from the group consisting of (1) alkali metal hydroxides (e.g. sodium hydroxide, potassium hydroxide, cesium hydroxide and rubidium hydroxide), (2) ammonium hydroxide, (3) the carbonate salts of these cations, (4) mixtures of ammonium hydroxide and ammonium carbonate, (5) hydrogen fluoride and (6) acidic ammonium and alkali metal fluorides (e.g. ammonium bifluoride, hydrogen fluoride, ammonium fluoride, sodium fluoride, potassium bifluoride, cesium fluoride and rubidium fluoride).

Hydrated titanium oxide is precipitated from the basic stripping solutions while the corresponding double fluoride, e.g. $(NH_4)_2TiF_6$, will precipitate from the acidic fluoride solutions when the double fluorides solubility in the aqueous phase is exceeded.

Stripping solutions having a minimum concentration of about 0.1 mole of the base or salt per liter are operable. Preferably solutions greater than 1 molar will be used as a practical matter.

The amount of the basic stripping solution to be utilized will be that amount which contains at least two moles and preferably four moles of the solute per mole of titanium present. With the acidic fluoride stripping solutions, the solution should contain at least four moles and preferably six moles of solute per mole of titanium present in the organic phase. For example, an amount of substantially saturated solution of ammonium carbonate equivalent to about 4 moles of the carbonate per mole of titanium preferably will be used to strip titanium from the DEHPA extract. With this basic strip solution, the aqueous and organic phases form two layers which are easily separable. Upon further standing the titanium values readily precipitate from the aqueous phase. Alternatively, if desired, the precipitation of the titanium values in the basic solution can be facilitated by heating.

Ammonium bifluoride, also when used in a slight equivalent molar excess was found to satisfactorily strip titanium from both the mono- and dialkyl phosphoric acids. Dilute bifluoride solutions removed the titanium in a soluble form while concentrated solutions, containing about 35 percent or more $NH_4HF_2$ on a weight basis, gave substantially immediate precipitation of the corresponding $(NH_4)_2TiF_6$. Precipitation of the titanium values as the fluoride necessitates conversion of this material to the hydrated titanium oxide by reaction with a base, preferably ammonia or aqueous ammonia prior to conversion into the anhydrous oxide. The resulting ammonium fluoride solution obtained as a by-product of this conversion may be heated to remove a portion of the ammonia and the residual neutral or acidic fluoride solution then be recycled for use in further stripping operations.

The so-precipitated hydrated titanium oxide is converted to the anhydrous oxide by calcination. Calcination at temperatures above about 800° C. for a minimum period of about 3 hours gives anhydrous titanium dioxide. Spectrographic analysis confirmed that the products meet substantially the specifications for a pigment-grade material.

The following examples will serve to illustrate the invention further but are not meant to limit it thereto.

*Example 1*

A 100 gram sample of Florida ilmenite ore containing about 35.5 percent titanium and 24 percent iron was taken in a reaction vessel and to this ore was added about 50 cubic centimeters of 90 percent sulfuric acid. (This acid was about a 50 percent excess of the stoichiometric requirement needed for the formation of $TiOSO_4$ and $FeSO_4$ from the titanium and iron present in the ore.) After the acidulation reaction had ceased, the ilmenite-acid reaction product was roasted at about 250° C. for about 1 hour.

The so-roasted acidulated product was then leached with about 200 cubic centimeters of water and the leach liquor separated by filtration from the residual solids. The resulting leach solution had a sulfuric acid content of about 20 percent.

The leach solution was then contacted in a liquid-liquid extractor for about 30 minutes with about a 30 weight percent solution of DEHPA dissolved in kerosene. The titanium and iron loaded organic extract was scrubbed with about 5 molar hydrochloric acid solution to strip the iron therefrom after which the two phases were separated.

To the titanium loaded, substantially iron free, organic phase was then added about 150 cubic centimeters of a substantially saturated solution of ammonium carbonate. The resulting aqueous and organic phases were separated, and the aqueous carbonate liquor subjected to evaporation by gentle heating, whereupon the titanium precipitated from this solution.

The precipitate was separated from the solution and calcined for about 4 hours at from about 850 to about 900° C. The resulting substantially white titanium dioxide product was shown upon X-ray diffraction to possess predominately the rutile crystal structure.

*Example 2*

A 500 gram sample of Ione ilmenite ore (upgraded and containing about 36 percent titanium, about 20 percent iron and high in manganese and calcium) was digested for about 2 hours with about 420 cubic centimeters of 96 percent $H_2SO_4$, utilizing about 2.2 g. of $Sb_2S_3$ as promoter. Following this reaction period, about 4100 cubic centimeters of water were added to the reactor and maintained in contact with the acidulated cake for about 4 hours at about 60° C. The mixture was then filtered and the residual cake washed with about 1280 cubic centimeters of water held at a temperature of about 30° C. Analysis of the resulting combined portions of the leach solution indicated that titanium recovery was about 82.5 percent and about 94 percent of the iron was dissolved.

The resulting leach solution was contacted in a mixer-settler apparatus with about stoichiometric molar equivalent quantities of monododecyl orthophosphoric acid (DDPA) for a total mixing and settling period of about 6 hours thereby extracting the titanium and iron values with the organic phase. The aqueous and organic phases then were separated. The loaded DDPA extract was then scrubbed with about 11 molar hydrochloric acid to strip the extracted iron values therefrom.

The substantially iron free organic phase was separated from the aqueous hydrochloric acid. A substantially stoichiometric molar quantity of about a 20 percent solution of ammonium bifluoride was contacted with the titanium loaded DDPA to strip the titanium therefrom.

The aqueous and organic phases were separated, the stripped organic phase now being ready for reuse, and the aqueous phase was concentrated by gentle heating and evaporation to precipitate the titanium therefrom as $(NH_4)_2TiF_6$.

The so-precipitated $(NH_4)_2TiF_6$ was reacted with aqueous ammonia to convert it to a hydrated titanium oxide. This product then was calcined at from about 900 to 1000° C. for about 4 hours to yield a white, anhydrous titanium dioxide.

*Example 3*

A 500 gram sample of Ione ilmenite ore as used in Example 2 was digested for about 1 hour with about 420 cubic centimeters of 96 percent $H_2SO_4$ utilizing about 2.2 grams of $Sb_2O_3$ as promoter. Following this reaction period, the acidulated mass was leached with sufficient water held at about 50° C. to give a solution of iron and titanium values in about 40 percent sulfuric acid.

This solution was treated with metallic iron thereby reducing the ferric iron to the less extractable ferrous state.

The aqueous solution was then treated with about stoichiometric molar equivalent quantities of monoheptadecylorthophosphoric acid in a counter-current extractor for a total aqueous-organic phase contact time of about 6 to 8 minutes. The titanium values were stripped from the aqueous phase into the organic extractant, and the so-loaded extract and aqueous phase separated.

The titanium loaded organic phase was then contacted with a substantially stoichiometric molar quantity of about a 30 percent solution of $(NH_4)HF_2$ which stripped the titanium from the organic phase.

The titanium values in the acidic ammonium bifluoride subsequently were treated as described for Example 2 to yield the desired white, anhydrous titanium dioxide.

Various modifications can be made in the process of the present invention without departing from the spirit or scope thereof for it is understood that we limit ourselves only as defined in the appended claims.

We claim:

1. A process for the preparation of titanium dioxide which comprises; (1) reacting an ilmenite ore with sulfuric acid, (2) leaching the acidulated ore to remove the dissolved titanium values therefrom, (3) reducing ferric iron to ferrous iron, (4) extracting said titanium values from the leach liquor with an extractant member selected from the group consisting of mono- and dialkyl substituted orthophosphoric acids, each alkyl group of said substituted acid containing from 4 to about 18 carbon atoms, (5) contacting the substantially iron free extract with an aqueous solution to strip the titanium values therefrom, the solute of said solution being a member selected from the group consisting of alkali metal hydroxide, ammonium hydroxide, ammonium carbonate, alkali metal carbonate, a mixture of ammonium hydroxide and ammonium carbonate, hydrogen fluoride, ammonium fluoride, ammonium bifluoride, alkali metal fluoride and alkali metal bifluoride, (6) precipitating and removing the titanium values from said aqueous solution, (7) converting said titanium values to the hydrated titanium oxide, and (8) calcining the precipitated hydrated titanium oxide thereby producing substantially iron-free anhydrous titanium dioxide.

2. A process for the preparation of titanium dioxide which comprises; (1) reacting an ilmenite ore with sulfuric acid, said acid having an $H_2SO_4$ content of greater than about 70 weight percent, the amount of said acid utilized being at least one stoichiometric molar equivalent for each mole of titanium and iron present in said ore, (2) leaching the acidulated ore with water to remove the dissolved titanium values therefrom, (3) contacting the leach liquor with an extractant selected from the group consisting of mono- and dialkyl substituted orthophosphoric acid, each alkyl group of said substituted acid containing from about 8 to about 17 carbon atoms and said acid being present in substantially stoichiometric molar equivalents with respect to the moles of metal values to be extracted, (4) scrubbing the titanium loaded organic extract with hydrochloric acid, said hydrochloric acid ranging in concentration from about 3 to about 12 molar and the amount of said hydrochloric acid being at least the stoichiometric molar equivalent of the moles of iron dissolved in said organic extract, (5) contacting the substantially iron-free scrubbed organic extract with an aqueous solution, the solute of said solution being a member selected from the group consisting of alkali metal hydroxide, ammonium hydroxide, ammonium carbonate, alkali metal carbonate, a mixture of ammonium hydroxide and ammonium carbonate, hydrogen fluoride, ammonium fluoride, ammonium bifluoride, alkali metal fluoride, and alkali metal bifluoride thereby removing the titanium values therefrom, (6) separating the aqueous and organic phases, (7) heating the titanium containing aqueous solution to precipitate the titanium values therefrom and converting said precipitated titanium values to the hydrated titanium oxide, and (8) separating the precipitated titanium values and calcining these at a temperature of at least 800° C. preparing substantially iron-free anhydrous titanium dioxide thereby.

3. The process as defined in claim 2 wherein the alkyl substituted phosphoric acid extractant is dissolved in a solvent, said solvent being insoluble in the phases contacted therewith but said extractant and said extractant-metal value extract being soluble therein.

4. A process for the preparation of titanium dioxide which comprises; (1) digesting an ilmenite ore with sulfuric acid, said acid having an $H_2SO_4$ content of at least 70 weight percent, and the amount of said acid utilized being from about a 25 to about 50 percent excess of the stoichiometric equivalent molar quantities needed to react with the metal values in said ore, (2) leaching the acidulated ore with water at a maximum temperature of about 80° C. to remove the dissolved titanium values therefrom, the amount of said water utilized giving a leach liquor containing less than 25 percent $H_2SO_4$, (3) contacting the leach liquor with di-(2-ethylhexyl)orthophosphoric acid dissolved in kerosene, said solution being about 1 molar in di-(2-ethylhexyl)orthophosphoric acid content and the amount of said substituted phosphoric acid utilized being substantially the stoichiometric molar equivalent of the moles of metal values to be extracted, (4) scrubbing the titanium loaded organic extract with hydrochloric acid, said hydrochloric acid being from about 4 to about 6 molar in concentration and the amount of said hydrochloric acid being at least the stoichiometric molar equivalent of the moles of iron dissolved in said organic extract, contacting the substantially iron-free scrubbed organic extract with a substantially saturated solution of ammonium carbonate to thereby remove the titanium values therefrom, (6) separating the stripped alkyl substituted phosphoric acid and the titanium loaded saturated ammonium carbonate solution, (7) heating and evaporating the titanium containing aqueous solution to precipitate the titanium values therefrom and (8) separating the precipitated titanium values and calcining these at from about 800° C. to about 1000° C. thereby preparing substantially iron-free anhydrous titanium dioxide thereby.

5. The process as defined in claim 4 wherein the acidulated ore is roasted at about 250° C. for at least 1 hour prior to leaching the ore with water to extract the dissolved titanium values therefrom.

6. A process for the preparation of titanium dioxide which comprises; (1) digesting an ilmenite ore with sulfuric acid, said acid having an $H_2SO_4$ content of at least 90 weight percent, and the amount of said acid utilized being from about a 25 to about 50 percent excess of the stoichiometric equivalent molar quantities needed to react with the metal values in said ore, (2) leaching the acidulated ore with water at a temperature of below about 70° C. to remove the dissolved titanium values therefrom, the amount of said water utilized giving a leach liquor containing less than about 75 percent $H_2SO_4$, (3) contacting the leach liquor with monododecyl orthophosphoric acid dissolved in kerosene, said solution being about 1 molar in monododecyl orthophosphoric acid content and the amount of said substituted phosphoric acid utilized being substantially the stoichiometric molar equivalent of the moles of metal values to be extracted, (4) scrubbing the titanium loaded organic extract with hydrochloric acid, said hydrochloric acid being from about 10 to about 12 molar in concentration and the amount of said hydrochloric acid being at least the stoichiometric molar equivalent of the moles of iron dissolved in said organic extract, contacting the substantially iron-free scrubbed organic extract with a dilute solution of ammonium bifluoride thereby removing the titanium values therefrom, (6) separating the stripped alkyl substituted phosphoric acid and the titanium loaded saturated ammonium befluoride solution, (7) treating the titanium containing aqueous solution with ammonia to precipitate the titanium values therefrom, and (8) separating the precipitated titanium values and calcining these at from about 800° C. to about 1000° C. thereby preparing substantially iron-free anhydrous titanium dioxide.

References Cited in the file of this patent

UNITED STATES PATENTS

| 2,055,221 | Ravenstad | Sept. 22, 1936 |
| 2,089,180 | Bousquet et al. | Aug. 10, 1937 |
| 2,304,110 | McKinney et al. | Dec. 8, 1942 |
| 2,349,936 | Bousquet et al. | May 30, 1944 |
| 2,439,895 | Keats et al. | Apr. 20, 1948 |
| 2,589,909 | Weikel et al. | Mar. 18, 1952 |

UNITED STATES PATENT OFFICE

CERTIFICATE OF CORRECTION

Patent No. 3,067,010 December 4, 1962

Ray S. Long et al.

It is hereby certified that error appears in the above numbered patent requiring correction and that the said Letters Patent should read as corrected below.

Column 1, line 30, for "FESO$_4$ ·7H$_2$O" read -- FeSO$_4$ ·7H$_2$O --; column 2, line 40, for "teaching" read -- leaching --; line 65, for "frmation" read -- formation --; column 8, line 44, for "befluoride" read -- bifluoride --.

Signed and sealed this 9th day of July 1963.

(SEAL)
Attest:

ERNEST W. SWIDER
Attesting Officer

DAVID L. LADD
Commissioner of Patents